United States Patent [19]

Albrecht et al.

[11] 3,995,877
[45] Dec. 7, 1976

[54] FIFTH WHEEL

[75] Inventors: William P. Albrecht; Ralph H. Sparks, both of Lancaster, Calif.

[73] Assignee: The United States of America as represented by the Administrator of the National Aeronautics and Space Administration, Washington, D.C.

[22] Filed: July 22, 1975

[21] Appl. No.: 598,504

[52] U.S. Cl. ............................................. 280/432
[51] Int. Cl.² ...................................... B62D 53/10
[58] Field of Search ................................... 280/432

[56] References Cited

UNITED STATES PATENTS

| 2,166,308 | 7/1939 | Logan | 280/432 |
| 2,450,201 | 9/1948 | Logan | 280/432 |
| 2,550,632 | 4/1951 | Young et al. | 280/432 |
| 2,843,398 | 7/1958 | Apgar | 280/432 X |
| 3,892,426 | 7/1975 | Ferris | 280/432 |

*Primary Examiner*—Robert R. Song
*Assistant Examiner*—R. Schrecengost
*Attorney, Agent, or Firm*—Monte F. Mott; Paul F. McCaul; John R. Manning

[57] ABSTRACT

An improved fifth wheel for a tractor-trailer rig, characterized by a first subassembly including a wear plate adapted to be mounted on a downwardly facing surface of a trailer and having a king pin projected normally therefrom, and a second subassembly adapted to be pivotally mounted on an upwardly facing surface of a tractor and brought into contiguous relation with the first subassembly, including a receiver for capturing the king pin and safety means responsive to a failure of the king pin or its latching mechanism for joining the first subassembly with the second subassembly.

3 Claims, 7 Drawing Figures

U.S. Patent  Dec. 7, 1976  Sheet 1 of 3  3,995,877

FIFTH WHEEL

ORIGIN OF THE INVENTION

The invention described herein was made by employees of the United States Government and may be manufactured and used by or for the Government for Government purposes without the payment of any royalties thereon or therefor.

BACKGROUND OF THE INVENTION

1. Field of the Invention

The invention generally relates to fifth wheel assemblies of the type having a vertically oriented king pin and employed in coupling tractor-trailer rigs, and more particularly to a safety device adapted to respond to the failure of a king pin or its latching mechanism for safely coupling the tractor-trailer rig in an alternate configuration.

2. Description of the Prior Art

As can be appreciated by those familiar with the maintenance and operation of tractor-trailer rigs, each of the fifth wheel assemblies employed for coupling a tractor-trailer rig usually includes a first wear plate rigidly mounted on a trailer, having a king pin projected therefrom, and a second wear plate pivotally mounted on the tractor, for receiving the first wear plate in contiguous relation, including a latching mechanism for capturing the king pin, whereby coupling of the trailer with the tractor is achieved by mating the wear plates with the king pin being disposed in a captured relationship with the latching mechanism.

Of course, as a consequence of operation of the rig, the king pin frequently is subjected to substantial wear and fatigue, the extent of which often remains undetected. In instances where a cargo of substantial value must be transported, utilizing tractor-trailer rigs, a great deal of interest has been focused on the potential loss which may be occasioned through failure of the king pins or their latching mechanisms employed in coupling the rigs.

For the purposes of the instant invention, it is to be understood that the term "failure", as it refers to king pins, is assumed to mean deformed and/or separated.

Therefore, it should be apparent that one of the unsolved problems facing those engaged in the manufacture and use of tractor-trailer rigs is that of providing a safety device which is economic, practical, easy to install aboard existing rigs, efficient in operation, and capable of responding to the failure of a king pin or its latching mechanism for achieving a coupling of a trailer with a tractor in an alternative configuration.

It is, therefore, a general purpose of the instant invention to provide a practical, economic, simplified and efficient safety device for coupling a tractor-trailer rig in an alternate configuration in response to the failure of the king pin relied upon for coupling the trailer with the tractor in a first configuration.

OBJECTS AND SUMMARY OF THE INVENTION

It is, therefore, an object of the instant invention to provide an improved fifth wheel assembly.

It is another object to provide an improved fifth wheel assembly for a tractor-trailer rig having a safety mechanism capable of responding to a failure of the king pin or its latching mechanism for coupling the rig in an alternate configuration.

It is another object to provide in a fifth wheel assembly a mechanism which is simple and economic to fabricate, practical to install, and efficient in operation for assuring that a failure of the king pin or its latching mechanism of a fifth wheel assembly for a tractor-trailer rig does not result in a decoupling of the rig.

It is another object to provide in a fifth wheel assembly of the type including a first subassembly adapted to be mounted on a trailer and including a king pin projected therefrom, and a second subassembly adapted to be mounted on a tractor and brought into contiguous relation with the first subassembly and including a receiver for receiving the king pin in a captured relationship, as the second subassembly is brought into contiguous relation with the first subassembly, the improvement including a practical, economic and efficient coupling mechanism adapted to respond to a failure of the king pin or its latching mechanism for coupling the first subassembly with the second subassembly.

These together with other objects and advantages are achieved through the use of an improved fifth wheel assembly for coupling a tractor-trailer rig including a first subassembly having a first wear plate rigidly affixed to the trailer, a king pin projected substantially orthogonally from the first wear plate, a second subassembly including a second wear plate pivotally mounted on the tractor, including a throat of a substantially V-shaped configuration having an apex near the center of the second wear plate for receiving the king pin, a latching mechanism mounted on the second wear plate, in juxtaposition with the apex of the throat, for capturing the king pin, and safety means for coupling the first wear plate with the second wear plate in response to motion imparted to the first wear plate relative to the second wear plate, in opposed directions substantially paralleling the longitudinal axis of symmetry of the trailer, including an arcuate body rigidly affixed to the first wear plate in concentric relation with the king pin, having an arcuate lip extended toward the king pin and adapted to engage a second arcuate lip projected from the second wear plate in concentric relation with the apex of the throat, and a pair of pivotal dogs mounted on the second subassembly and supported at opposite sides of the throat for pivotal motion in substantially vertical planes adapted to cooperate with the second arcuate lip for defining an arcuate receiver for the arcuate body, so that upon failure of the king pin or its latching mechanism the arcuate body is caused to be confined by the arcuate receiver, as will hereinafter become more readily apparent by reference to the following description and claims in light of the accompanying drawings.

DESCRIPTION OF THE PREFERRED EMBODIMENT

Figure 1:
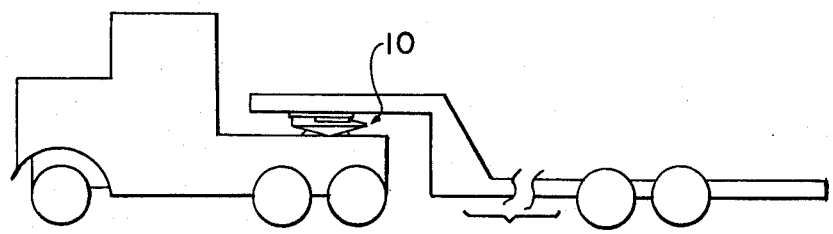
FIG. 1 comprises a fragmented pictorial view illustrating an environment for an improved fifth wheel assembly which embodies the principles of the instant invention.

Referring now with more particularity to the drawings, wherein like reference characters designate like or corresponding parts throughout the several views, there is, in FIG. 1, schematically illustrated a tractor-trailer rig having a fifth wheel assembly, generally designated 10, which embodies the principles of the instant invention.

As shown, the fifth wheel assembly 10 is provided to be employed for coupling a trailer with a tractor of the rig, not designated. Since the tractor-trailer rig forms no specific part of the instant invention, a detailed description thereof is omitted in the interest of brevity. However, it is to be understood that the fifth wheel assembly 10 serves to couple the tractor and trailer in a manner such that pivotal motion between the tractor and trailer is accommodated through the fifth wheel assembly.

The fifth wheel assembly 10, as illustrated, includes a first subassembly 12, adapted to be rigidly mounted on a downwardly facing surface of the trailer of the tractor-trailer rig, and a second subassembly 14 which is adapted to be mounted on the tractor, in a manner well understood by those familiar with fifth wheel assemblies. As shown in the drawings, the first subassembly 12 includes a wear plate 16 adapted to be affixed to the trailer and having a planar bearing surface 17 from which is projected a rigid, orthogonally related king pin 18. The subassembly 14, on the other hand, includes a wear plate 20 of a substantially circular configuration, FIG. 4, and a planar face 21 upon which the planar surface 17 of the wear plate 16 rests when the fifth wheel assembly 10 is in a coupled configuration.

Figure 4:
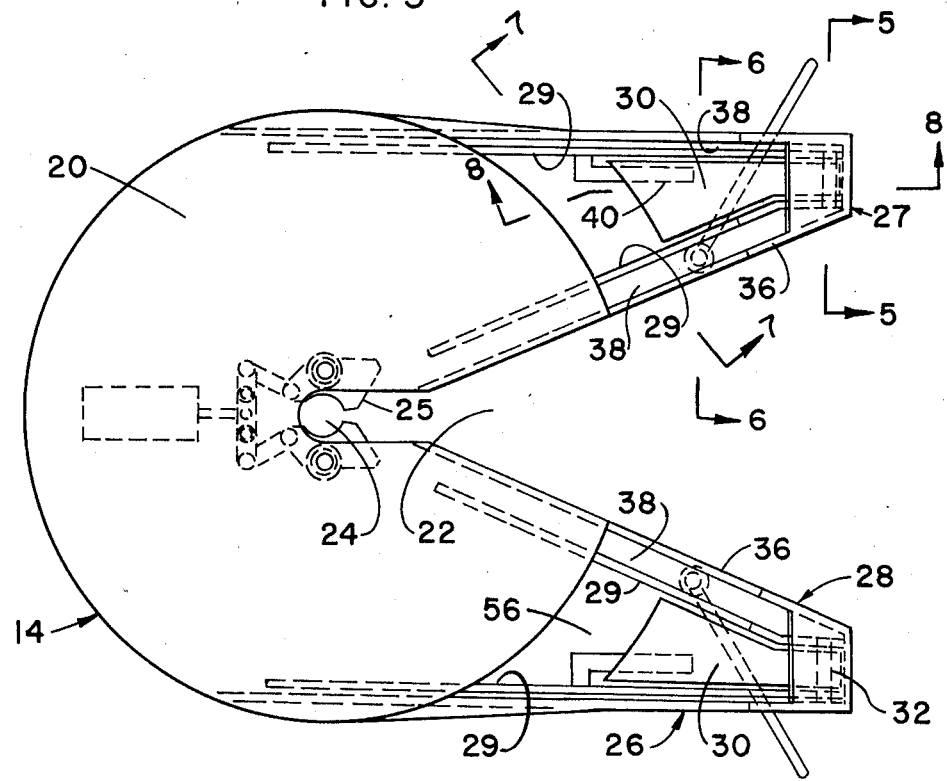
FIG. 4 is a top plan view of the other subassembly of the pair.
Figure 5:
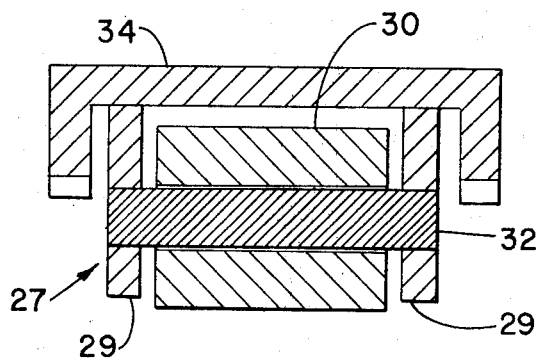
FIG. 5 is a cross-sectional view taken generally along line 5—5 of FIG. 4.
Figure 6:
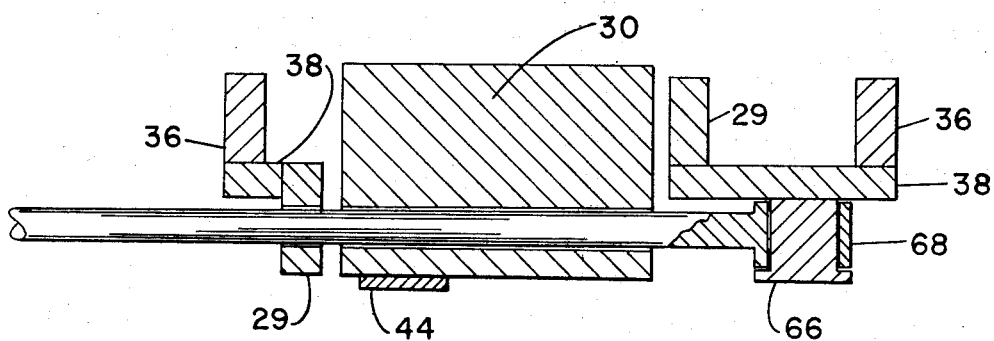
FIG. 6 is a partially sectioned view taken generally along line 6—6 of FIG. 4.
Figure 7:
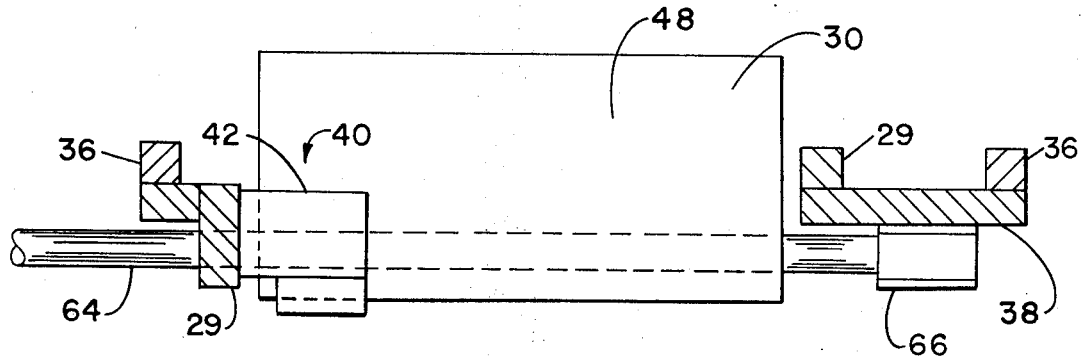
FIG. 7 is a partially sectioned view taken generally along line 7—7 of FIG. 4.

In order to accommodate the establishment of a coupled configuration for the fifth wheel assembly 10, the subassembly 14 is provided with a throat 22, FIG. 4, having a V-shape, which serves to accommodate passage of the king pin 18, as the king pin is advanced and retracted relative to a latching mechanism, generally designated 24.

As a practical matter, the latching mechanism 24 includes suitable flukes 25 which serve to releasibly capture the king pin 18 for securing the fifth wheel assembly 10 in a normally coupled configuration, one in which the subassembly 12 is supported by the subassembly 14 and connected therewith via the king pin 18.

The flukes 25 supported for pivotal motion near the apex of the throat 22 serve to capture the king pin 18 as the king pin is moved toward the apex of the throat for thereby establishing a normally coupled configuration for the assembly 10. It is to be understood, of course, that the flukes 25 are selectively operated by an actuator, not designated, connected therewith through suitable linkage, also not designated. Since the latching mechanism 24 is of any suitable commercially available design and forms no specific part of the instant invention, a more detailed description thereof is omitted in the interest of brevity. However, it will be appreciated that, in operation, the flukes are pivotally displaced with respect to the throat 22 for purposes of both capturing and releasing the king pin 18.

In the event a king pin 18, or its latching mechanism 24, for a fifth wheel assembly 10, experiences failure, the fifth wheel assembly 10 becomes coupled in an alternate configuration through a safety mechanism which embodies the principles of the instant invention. The safety mechanism includes a pair of stop mechanisms 26 mounted at the trailing ends of a pair of arms 27 and 28. These arms are extended rearwardly with respect to the wear plate 20, as best illustrated in FIG. 4.

Since the stop mechanisms 26 are of a similar design, function in a similar manner, for achieving a similar result, a detailed description of a single one of the stop mechanisms is deemed sufficient to provide a complete understanding of the instant invention. However, as shown in the drawings, it is to be understood that the components of the arms 27 and 28 are similarly designated for purposes of enhancing the understanding of the disclosed invention.

Each of the arms 27 and 28 consists of a pair of angularly related plates 29 disposed in mutually spaced, vertically oriented planes projected rearwardly from the wear plate 20. Between the side plates 29 there is a pivotal stop comprising a vertically movable dog 30. This dog is pivotally connected with the side plates by a suitable pivot pin 32 extended through a boss, not designated, provided at the base of the dog and received by distal end segments of the plates, in suitable bores, also not designated.

While the dog 30 is, for the sake of convenience, illustrated as being a substantially solid member, it is to be understood that the specific configuration to which the dog 30 conforms is dictated, at least in part, by load requirements. Therefore, where so desired, the dog 30 may assume a channular cross-sectional configuration formed by casting or the like.

Mounted on the side plates 29, at the distal ends of the arms 27 and 28, in a protective relationship with the boss for the dog 30, there is a protective shroud 34. The shroud 34 provided for each of the arms 27 and 28 is supported by a pair of rails 36. These rails, in turn, extend in substantial parallelism with the side plates 29 and terminate at a base located beneath and integrally related to the wear plate 20. The side plates 29 and rails 36 preferably are interconnected throughout their lengths by webs 38. Where desired, the side plate 29, the rails 36, and the webs 38 are welded into an integrated relationship. However, other suitable means can be employed equally as well.

It is to be understood that each of the dogs 30 is supported for pivotal motion between elevated and depressed positions. Consequently, as the subassemblies 12 and 14 are brought into contiguous relation the dogs 30 are engaged by the subassembly 12 and are forced downwardly from their elevated positions. In order to support the dogs in their elevated position, each of the arms 27 and 28 is provided with a torsion unit 40 including a base 42 welded or otherwise rigidly affixed to one of the side plates 29 and having projected therefrom a resilient leaf member 44. The leaf member 44 projects from the base 42 and terminates beneath the dog 30 in spring biasing engagement with a cam surface 46 provided along the lower surfaces of the dog. The cam surface 46 is inclined with respect to vertical so that sliding engagement thereof with the adjacent surface of the leaf member 44 is accommodated. Of course, the leaf member 44 is characterized by a preselected coefficient of resiliency which permits the leaf member to support the dog 30 in its elevated position, while accommodating angular displacement of the dog to a depressed disposition, as will hereinafter be more fully understood.

Each of the dogs 30 also includes a planar face 48 disposed in a substantially vertically oriented plane. This face functions as an abutment when the dog 30 is in its elevated disposition and is arranged in spaced relation with a segment of a crown 50 defined about peripheral segments of the wear plate 20.

Figure 2:
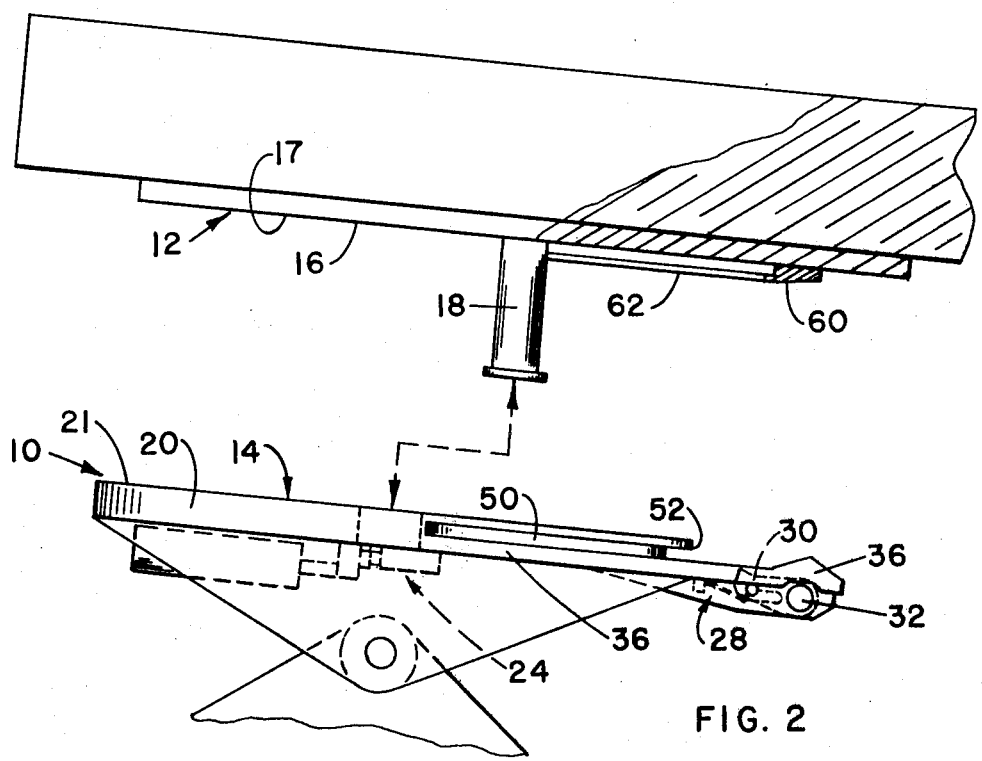
FIG. 2 is a partially sectioned, exploded view illustrating, on an enlarged scale, a pair of subassemblies included within the fifth wheel assembly shown in FIG. 1.
Figure 8:
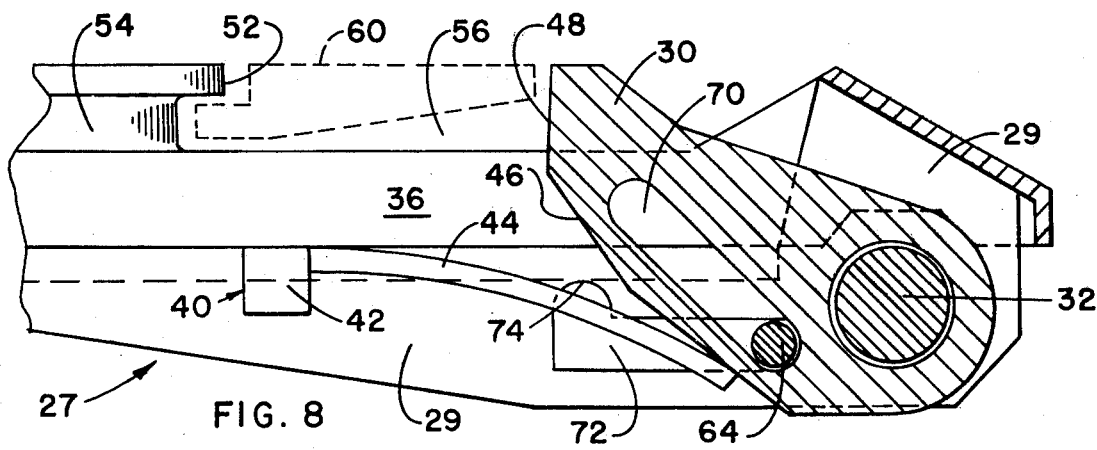
FIG. 8 is a partially sectioned view taken generally along line 8—8 of FIG. 4.
Figure 3:
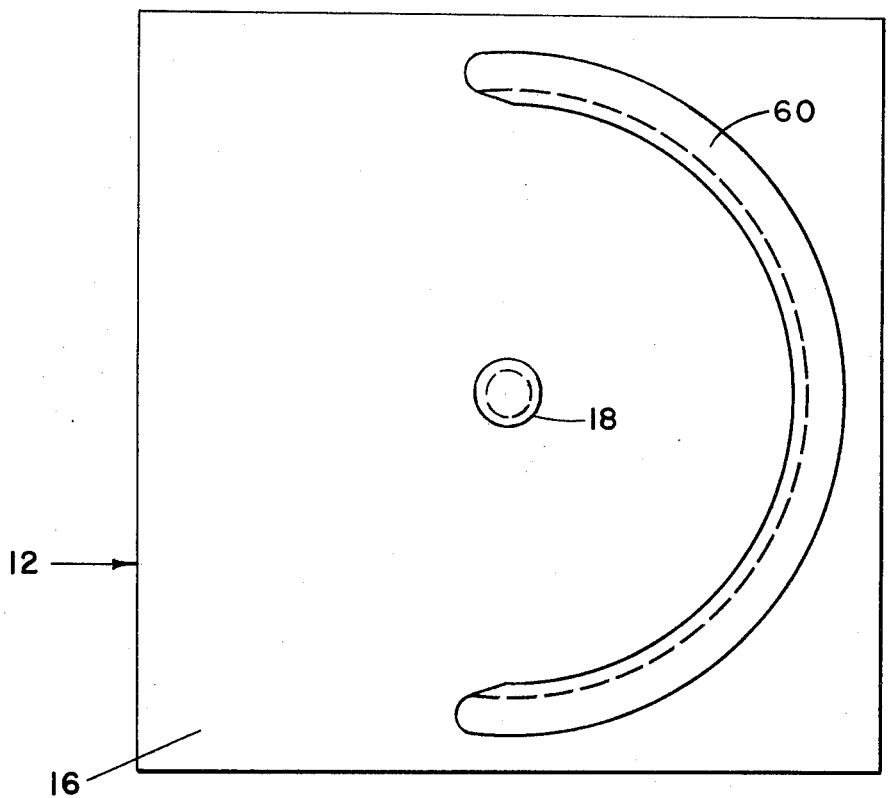
FIG. 3 is a bottom plan view of one subassembly of the pair of subassemblies.

The crown 50, as best illustrated in FIG. 2, is of an arcuate configuration and includes a radially extended lip 52 elevated relative to the adjacent surfaces of the rails 36, FIG. 8. Thus, the lip 52 serves to define between the lower surface thereof and the upper surfaces of the rails 36, a pair of segments of arcuate slot 54 located at opposite sides of the throat 22. It should, therefore, be appreciated that the pair of dogs 30 and the crown 50, of the wear plate 20, serve to define therebetween an interrupted arcuate relief 56 which, in practice, functions as a receiver, of an arcuate configuration, for an arcuate body 60 rigidly affixed to the wear plate 16 of the subassembly 12.

It is to be understood that the arcuate body 60 is rigidly affixed to the planar surface 17 of the wear plate 16 as by welding, or the like. Moreover, the body 60 is concentrically related to the king pin 18. Moreover, the radius of the arcuate body 60 is substantially equal to that of the arcuate relief 56. However, the radial width of the body 60 is slightly less than the radial width of the arcuate relief 56 so that impacting engagement between opposed arcuate surfaces for the body 60 and the crown 50 and the dogs 30 is precluded so long as the king pin 18 remains in a captured relationship with the latching mechanism 24.

The body 60 preferably includes a lip 62, also of an arcuate configuration, extended toward the king pin 18 in a concentric relation therewith. The vertical thickness of the lip 62 is slightly less than that of the slot 54 so that the lip 62 may be received beneath the lip 52, within the arcuate slot 54 for thus establishing therebetween an interlocking relationship as relative motion between the lips 52 and 62 occurs.

In view of the foregoing, it should be apparent that in the event the king pin 18 or its latching mechanism 24 fails, when the fifth wheel assembly 10 is in its normally coupled configuration, the body 60 is caused to move into engagement with the crown 50 or, alternatively, into engagement with the faces 48 of the dogs 30. Of course, the body 60 is free to advance along the arcuate relief 56 in order to accommodate pivotal motion of the subassembly 12, relative to the subassembly 14.

In order to initiate a release of the dogs 30, for thus facilitating a de-coupling of the fifth wheel assembly 10, there is provided a dog actuator, not designated. The dog actuator includes a lever arm 64 pivotally supported by a vertically oriented pin 66 suspended from beneath one of the webs 38 and joined thereto by welding or the like. The lever arm is united with the pin 66 through a boss 68 concentrically related to the pin 66 and supported thereby, while the lever arm 64 is extended in a substantially horizontal plane through an inclined slot 70 defined in the dog 30, as best shown in FIG. 8.

Additionally, the lever arm 64 is extended through a slot 72 provided in a substantially horizontal plane and defined in one of the side plates 29. Thus, the lever arm 64 is extended through both of the slots 70 and 72 whereby pivotal motion imparted thereto about the pin 66 occurs in a substantially horizontal plane. Of course, as such pivotal motion is imparted to the lever arm 64, the dog 30 is cammed downwardly, due to the forces applied by the surface of the lever arm against the adjacent surfaces of the inclined slot 70. Thus, angular displacement of the dog against the applied forces of the spring member 44 is achieved for thus displacing the dog to its depressed disposition. Of course, as the lever arm 64 is pivotallly returned to its initial position, the leaf member 44 of the torsion unit 40 urges the pivotal dog 30 upwardly toward its elevated disposition, relative to the upper surface of the rails 36.

As a practical matter, the leaf member 44 of the unit 40 continuously applies to the dog 30 an upwardly directed force. Consequently, an upwardly directed force also is applied continuously to the lever arm 64, particularly when the dog 30 is in a depressed disposition. Moreover, the lever arm 64 is characterized by limited freedom of motion in a vertical plane, introduced through a loose fit at the boss 68. Consequently, a relief 74 is provided near the end of the slot 72 with which the arm 64 is juxtaposed when the dog is depressed. This relief receives the lever arm 64 as deflection thereof is achieved in response to the forces applied thereto by the leaf member 44, acting through the dog 30. Of course, so long as the lever arm 64 remains seated in the relief 74 pivotal motion of the arm in a horizontal plane is precluded. Thus it is possible to secure the dog 30 in a depressed configuration. Accordingly, it should be apparent that the dogs 30 may be depressed against the forces of the torsion units 40 through pivotal motion imparted to the lever arm 64, and secured in place by positioning the lever arms 64 in the reliefs 74 so that a de-coupling of the fifth wheel assembly 10 is thereby accommodated.

OPERATION

It is believed that in view of the foregoing description, the operation of the device will readily be understood and it will be briefly reviewed at this point.

With the subassembly 12, mounted on a trailer of a tractor-trailer rig, and the subassembly 14, mounted on the tractor of the rig, the fifth wheel assembly 10 is coupled in a normal configuration simply by causing the king pin 18 to move laterally along the throat 22 into a captured relationship with the latching mechanism 24. Of course, as the fifth wheel assembly 10 is caused to assume a normally coupled configuration, the arcuate body 60 of the subassembly 12 is permitted to ride over the shroud 34 into engagement with the dogs 30. The dogs are depressed responsively against the applied forces of the torsion units 40. While each of the dogs 30 approaches the limits of its downward throw, it does not achieve displacement to the limit of the throw, since the body 60 normally does not seat on the upper surface of the rails 36. Consequently, the lever arms 64, as they are pivotally displaced in horizontal planes, in response to the downward motion imparted to the dogs 30, by the body 60, do not reach a position opposite the relief 74. Thus, the lever arm 64 is afforded pivotal displacement toward its original disposition, once the dog 30 is released and advanced upwardly under the applied forces of the leaf member 44.

Once the fifth wheel assembly 10 assumes a normally coupled configuration, such is maintained until the king pin is released by the latching mechanism 24.

Preparatory to a release of the king pin 18 by the latch mechanism 24, the lever arms 64 are pivotally displaced along the slot 72 for displacing the dogs 30, in a vertical plane, to depressed dispositions. As the arms 64 are positioned opposite the relief 74, the arms are released, whereupon the arms move upwardly under the influence of the applied forces of the leaf members 44 acting on the dogs 30. Thus the dogs 30 are secured in their depressed dispositions. A de-coupling of the fifth wheel assembly 10 is now achieved by displacing the subassembly 12, of the assembly 10, relative to the subassembly 14, in a manner well understood by those familiar with the operation and function of fifth wheel assemblies.

However, in the event the king pin 18 or its latching mechanism 24 fails, while the fifth wheel assembly 10 is in a normally coupled configuration, the arcuate body 60 engages the faces 48 of the dogs 30 or, alternatively, the crown 50 of the wear plate 20 with the lips 52 and 62 being caused to assume an interlocked relationship. Thus, the assembly 10 assumes an alternate coupled configuration.

While not shown, it is to be understood that where so desired, an electrical switch can be employed in combination with the arcuate body 60 for providing an electrical signal to the operator of the tractor, in the event the body 60 engages either of the dogs 30 or the crown 50, for thus indicating a failure of the king pin 18. However, as a practical matter, an operator of a rig equipped with the improved fifth wheel assembly of the instant invention can readily detect failure of the king pin.

In view of the foregoing, it should be apparent that the safety mechanism of the instant invention provides a practical solution to the perplexing problem of avoiding de-coupling of fifth wheel assemblies as a consequence of the failure of king pins, or their latching mechanisms.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. In combination with a tractor-trailer rig an improved fifth wheel assembly for coupling the trailer with the tractor of said rig, comprising:
  A. a first subassembly including a first wear plate rigidly affixed to the trailer;
  B. a king pin projected substantially orthogonally from said first wear plate;
  C. a second subassembly including a second wear plate pivotally mounted on said tractor including means defining in the second wear plate a receiver including a throat of a substantially V-shaped configuration having an apex disposed near the center of said second wear plate for receiving said king pin;
  D. means mounted on said second wear plate in juxtaposition with the apex of said throat for capturing said king pin;
  E. safety means responsive to motion imparted to said first wear plate, relative to said second wear plate, in opposed directions substantially paralleling the longitudinal axis of symmetry of said tractor for coupling the first wear plate to the second wear plate including,
    an arcuate body rigidly affixed to said first wear plate in concentric relation with said king pin and including a first arcuate lip extended toward said king pin, and
    means defining on said second wear plate a crown including a second arcuate lip characterized by a pair of segments concentrically related to the apex of said throat and extended radially therefrom at opposite sides of the throat and adapted to engage said first arcuate lip;
  F. a pair of pivotal dogs mounted on said second subassembly and supported at opposite sides of said throat for pivotal motion in vertical planes between elevated and depressed positions, including a pair of substantially upstanding faces for defining between the faces and the second arcuate lip an arcuate receiver for said arcuate body;
  G. means including a pair of springs for supporting said pair of dogs in said first position;
  H. means including a pair of pivotal arms connected with said pair of dogs adapted to be manipulated for imparting pivotal motion to said dogs for displacing the dogs against said torsion springs from said elevated position to said depressed position; and
  I. means for releasibly securing said pair of dogs against pivotal displacement from said depressed position.

2. In a fifth wheel assembly including a first subassembly adapted to be mounted on a trailer and characterized by a king pin projected therefrom, and a second subassembly adapted to be mounted on a trailer and brought into contiguous relation with said first subassembly characterized by a partial crown having a first arcuate lip and receiver means for receiving said king pin in a captured relationship as said second subassembly is brought into contiguous relation with said first subassembly, the improvement comprising:
  safety means including,
  A. an arcuate body rigidly affixed to said first subassembly in concentric relation with said first king pin and having a second arcuate lip adapted to mate with said first arcuate lip in an interlocked relationship as the second subassembly is brought into contiguous relation with said first subassembly;
  B. means defining at least one spring-biased, depressible dog mounted on said second subassembly in spaced relation with said receiver means for engaging said arcuate body; and
  C. manually operable means including a pivotal lever arm mounted on said second subassembly for selectively depressing said dog.

3. In a fifth wheel assembly including a first subassembly adapted to be mounted on a trailer and characterized by a first wear plate having a king pin projected downwardly therefrom, and a second subassembly including a second wear plate of a circular configuration adapted to be mounted on a trailer and brought into contiguous relation with said first wear plate, characterized by a peripheral surface having a first lip of an arcuate configuration radially extended therefrom and means concentrically related to said peripheral surface for receiving said king pin in a captured relationship, the improvement comprising:
  safety means including,
  A. an arcuate body rigidly affixed to said first wear plate in concentric relation with said king pin having a second lip of an arcuate configuration so arranged as to assume an interlocked relationship with said first lip as the second wear plate is brought into contiguous relation with said first wear plate;

B. means defining at least one spring-biased, depressible dog mounted on said second subassembly in spaced relation with said first lip for capturing said arcuate body as the first and second lips are caused to assume an interlocked relationship; and C. means including a manually operable lever arm mounted on said second subassembly for selectively depressing the dog.

* * * * *